(12) United States Patent
Lee

(10) Patent No.: US 7,352,174 B1
(45) Date of Patent: Apr. 1, 2008

(54) NON-CONTACT ROTARY MOVEMENT SENSOR PROVIDED WITH INDEPENDENT SWITCH

(75) Inventor: Hyo Moon Lee, Busan (KR)

(73) Assignee: Control & Measurement Systems Co., Ltd., Busan (KR)

( * ) Notice: Subject to any disclaimer, the term of this patent is extended or adjusted under 35 U.S.C. 154(b) by 0 days.

(21) Appl. No.: 11/806,212

(22) Filed: May 30, 2007

(30) Foreign Application Priority Data

Nov. 16, 2006 (KR) ...................... 10-2006-0113323

(51) Int. Cl.
*G01B 7/30* (2006.01)
(52) U.S. Cl. .............................. 324/207.25; 324/207.2; 324/207.14; 335/205; 335/206; 335/207
(58) Field of Classification Search ............. 324/207.2, 324/207.14, 207.25; 335/205–207
See application file for complete search history.

(56) References Cited

U.S. PATENT DOCUMENTS 6,597,168 B1    7/2003    Lee

FOREIGN PATENT DOCUMENTS

| KR | 10-0504106 | 7/2005 |
|---|---|---|
| KR | 10-0458375 | 11/2005 |

*Primary Examiner*—Ramon M. Barrera
(74) *Attorney, Agent, or Firm*—Venable LLP; Henry J. Daley

(57) ABSTRACT

It is an object of the present invention to provide a non-contact rotary movement sensor capable of, by making magnetic fields from a plurality of permanent magnets not mutually affected, independently implementing an output signal and a switching signal using the same. It is another object of the present invention to provide a non-contact rotary movement sensor provided with an independent switch which outputs an output signal by using a permanent magnet and a Hall device and outputs a switching signal using a contact switch. The non-contact rotary movement sensor with an independent switch includes: a rotating body, provided with a first permanent magnet installed on an upper part, a key slot installed on a lower part, and a second permanent magnet installed on a trigger which is projected on a part of an external circumference, for being rotatably driven by an external force, wherein the first permanent magnet and the second permanent magnet are installed not to be affected by mutual magnetic fields; and a printed circuit board provided with at least one Hall device for outputting a linear output signal by detecting a direction change of a magnetic field of the first permanent magnet and at least one lead switch for outputting a switching signal by detecting a strength change of a magnetic field of the second permanent magnet.

19 Claims, 8 Drawing Sheets

NON-CONTACT ROTARY MOVEMENT SENSOR PROVIDED WITH INDEPENDENT SWITCH

BACKGROUND OF THE INVENTION

1. Field of the Invention

The present invention relates to a non-contact rotary movement sensor capable of independently implementing an output signal and a switching signal by corresponding two permanent magnets which have different magnetic flux directions respectively to a Hall device and to a lead switch or by corresponding one permanent magnet to the Hall device and using a contact switch as a switching signal.

2. Background of the Related Art

Generally, a rotary movement sensor is used for applying a amount of physical change of a continuously changing rotating body to an electric circuit, and a rotary position displacement sensor with a linear electric signal output function is used in various ways in each field of industry.

A rotary movement sensor is used mainly in position control of engine throttle valve of a vehicle, control of a steering wheel, height control of a vehicle, variable vane position control of an intake and exhaust valves of an engine, or speed control of an engine corresponding to the movement of an accelerator pedal. Also, a rotary movement sensor is used in control of the engine rotation speed of an agricultural machine or a heavy equipment and measurement of opening and closing of a fluid supply valve.

Many methods are used for measuring a rotary displacement, such as a potentiometer method which proportionally outputs the rotary angle of a rotating body which relatively moves to a fixed body, an encoder method which outputs as an optical code, an induced magnet measurement method, and an integrated circuit method using a Hall effect of a magnetic resistance.

A rotary movement sensor should be able to be used at the temperature of −40□ to 70□ which is required in rough working condition of a vehicle for commercial use or a heavy equipment and maintaining the durability which exceeds five million operation times which is required in an environmental condition such as dust and working.

A conventional contact type variable resistance sensor has weak points that the electric characteristic is not constant according to the temperature, and that the durability or the life span is shortened by the abrasion of the electric resistance track which is a contact part of a variable resistance and a brush. Especially, the contact type variable resistance sensor has a difficulty in working as the initially set electric resistance value changes during usage.

Korean registered patent No. 0504106 and No. 0458375 and U.S. Pat. No. 6,597,168 suggest non-contact type rotary movement sensors for making up for the weak points of a contact type rotary movement sensor. However, the non-contact type rotary movement sensors of the above-mentioned patents have the weak points that the production structure is complex as a balanced sensing bar with multiple openings is included in the configuration, and that switching is dependent on signal outputting.

SUMMARY OF THE INVENTION

Technical Problem

The present invention has been proposed in order to overcome the above-described problems in the related art. It is, therefore, an object of the present invention to provide a non-contact rotary movement sensor capable of, by making magnetic fields from a plurality of permanent magnets not mutually affected, independently implementing an output signal and a switching signal using the same.

It is another object of the present invention to provide a non-contact rotary movement sensor provided with an independent switch which outputs an output signal by using a permanent magnet and a Hall device and outputs a switching signal using a contact switch.

It is still another object of the present invention to provide a non-contact rotary movement sensor capable of protecting an inner structure from a foreign material from outside by forming a separating plate which physically separates multiple permanent magnets, a Hall device and a lead switch.

It is still another object of the present invention to provide a non-contact rotary movement sensor capable of protecting an inner structure from an external magnetic or electric disturbance by including a shielding cover which covers and wraps a printed circuit board in a configuration.

Technical Solution

In accordance with an aspect of the present invention, there is provided a non-contact rotary movement sensor with an independent switch, including: a rotating body, provided with a first permanent magnet installed on an upper part, a key slot installed on a lower part, and a second permanent magnet installed on a trigger which is projected on a part of an external circumference, for being rotatably driven by an external force, wherein the first permanent magnet and the second permanent magnet are installed not to be affected by mutual magnetic fields; and a printed circuit board provided with at least one Hall device for outputting a linear output signal by detecting a direction change of a magnetic field of the first permanent magnet and at least one lead switch for outputting a switching signal by detecting a strength change of a magnetic field of the second permanent magnet.

In accordance with another aspect of the present, there is provided a non-contact rotary movement sensor with an independent switch, including: a rotating body, provided with a permanent magnet installed at an upper part, a key slot installed at a lower part, and a pushing rod installed on a trigger which is projected on a part of an external circumference, for being rotatably driven by an external force; and a printed circuit board connected with at least one Hall device for outputting a linear output signal by detecting a direction change of a magnetic field of the permanent magnet, a common contact part which moves by the pushing rod according to the rotation of the rotating body, and a first contact part and a second contact part which are contacted with the common contact part, alternatively.

BRIEF DESCRIPTION OF DRAWINGS

The above and other objects and features of the present invention will become apparent from the following description of the preferred embodiments given in conjunction with the accompanying drawings, in which.

DETAILED DESCRIPTION OF THE INVENTION

Figure 1:
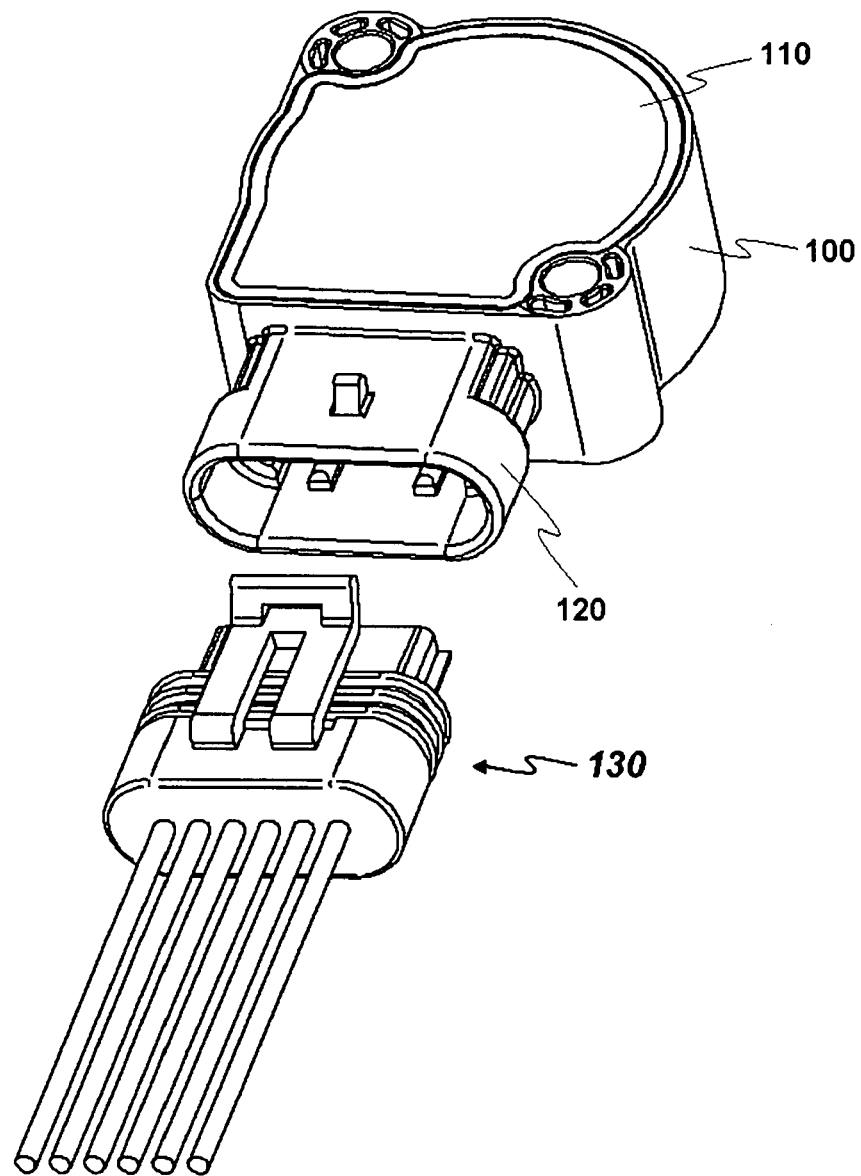
FIG. 1 is a perspective view illustrating a non-contact rotary movement sensor with an independent switch in accordance with one embodiment of the present invention.

Hereinafter, a preferred embodiment of the present invention will be described in detail with reference to the accompanying drawings.

Before describing the embodiments of the present invention, the terms and words used in the specification and claims must not be interpreted in their usual or dictionary sense, but are to be interpreted as broadly as is consistent with the technical thoughts of the invention disclosed herein based upon the principle that the inventor can define the concepts of the terms properly in order to explain the invention in the best way.

Accordingly, the embodiments described in this specification and the construction shown in the drawings are nothing but one preferred embodiment of the present invention, and it does not cover all the technical ideas of the invention. Thus, it should be understood that various changes and modifications may be made upon the point of time of this application.

Figure 2:
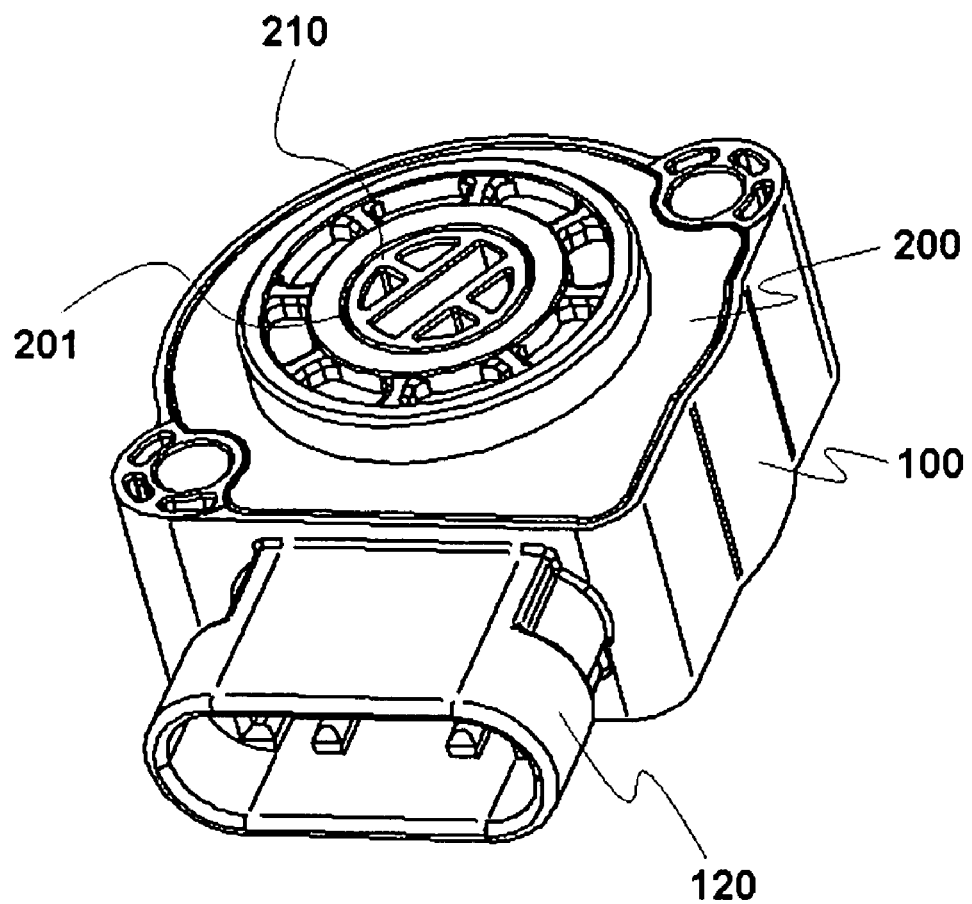
FIG. 2 is a perspective view showing a back side of FIG. 1 in accordance with one embodiment of the present invention.

FIG. 1 is a perspective view illustrating a non-contact rotary movement sensor with an independent switch in accordance with one embodiment of the present invention and FIG. 2 is a perspective view showing a back side of FIG. 1 in accordance with one embodiment of the present invention. As shown in FIG. 1 and FIG. 2, the non-contact rotary movement sensor in accordance with one embodiment of the present invention includes a housing 100 which is connected to a fixed part of a car body such as a chassis. At this time, one side of the housing 100 is partly covered with a first housing cover 110, and the other side is covered with a second housing cover 200 where a penetrating hole is formed for a key slot 210 where a working area of a pedal of a valve is inserted to be exposed. Also, on a side part of the housing 100, a connector 120 is formed through which a wire 333 is capable of being connected to an external counter connector 130.

Figure 3:
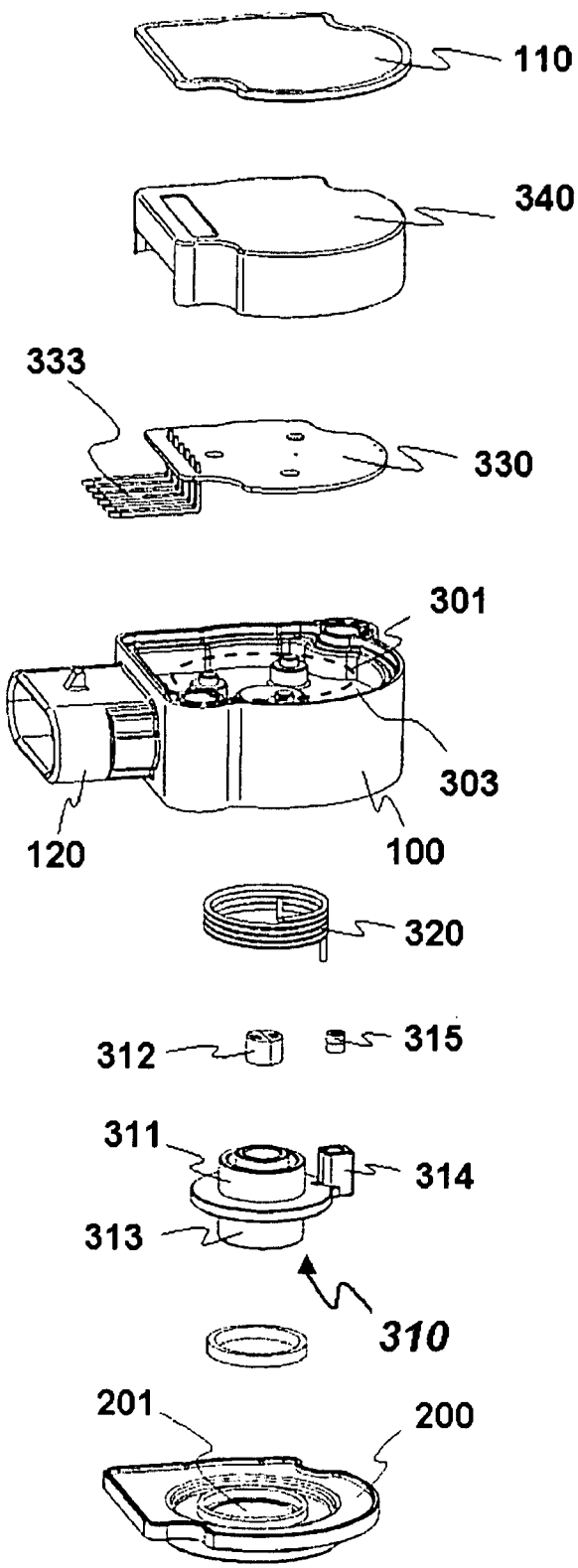
FIG. 3 is an exploded perspective view illustrating a non-contact rotary movement sensor with an independent switch in accordance with one embodiment of the present invention.
Figure 4:
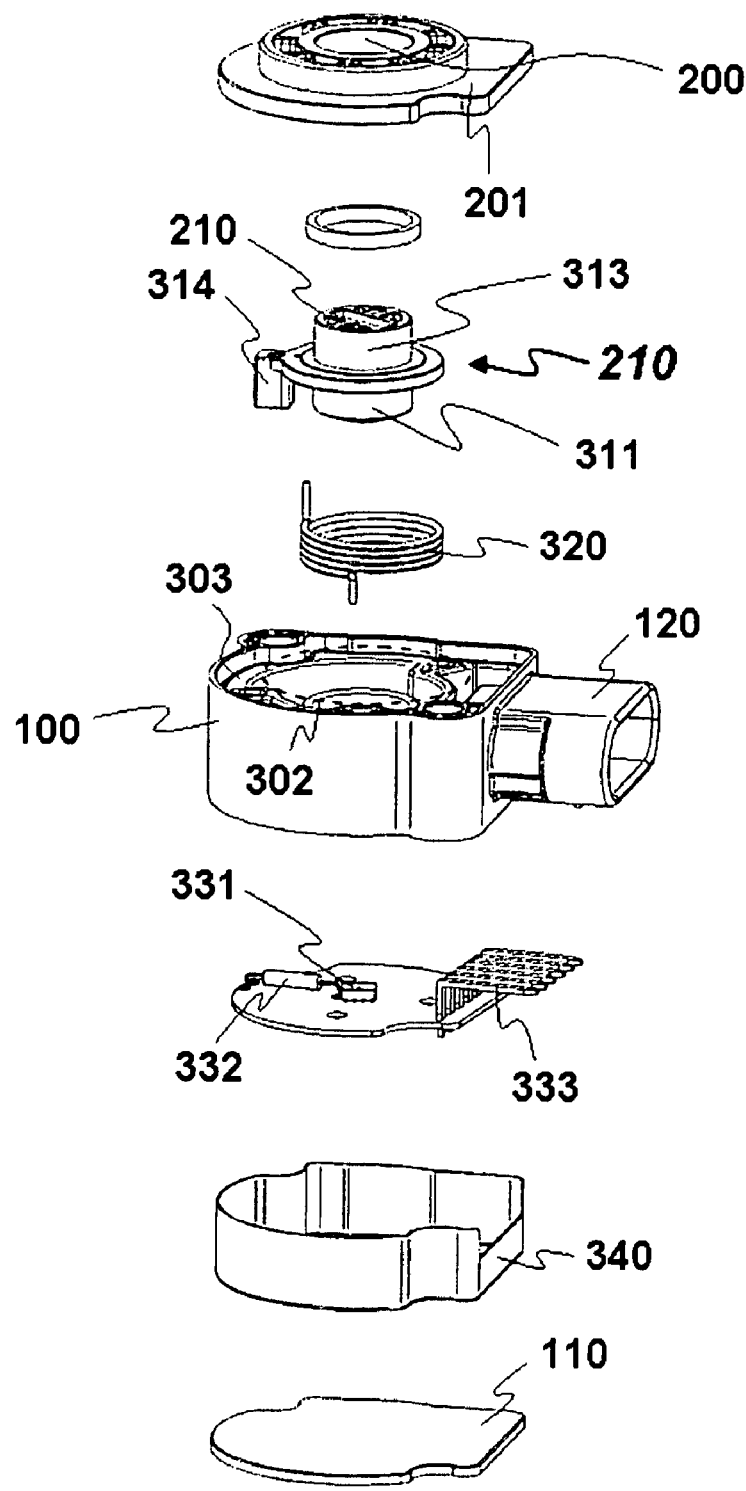
FIG. 4 is an exploded perspective view showing a back side of FIG. 3 in accordance with one embodiment of the present invention.

FIG. 3 is an exploded perspective view illustrating a non-contact rotary movement sensor with an independent switch in accordance with one embodiment of the present invention and FIG. 4 is an exploded perspective view showing a back side of FIG. 3 in accordance with one embodiment of the present invention. As shown in FIG. 3 and FIG. 4, the non-contact rotary movement sensor in accordance with one embodiment of the present invention comprises a housing 100, a rotating body 310, a restoring spring 320, a printed circuit board 330, a shielding cover 340 and other components.

A separating plate 303 is formed at an inside of the housing 100 in accordance with one embodiment of the present invention housing 100, to separate the inside of the housing 100 into a first area 301 and a second area 302. And, the first area 301 including an upper part is covered with the first housing cover 110, and the second area 302 including a lower part is covered with the second housing cover 200 where the penetrating hole 201 is partly formed. Also, the connector 120 with the inside penetrated, is externally projected at a side part of the housing 100.

A rotating body 310 in accordance with one embodiment of the present invention includes a first permanent magnet 312 which is fixed at an upper part 311, a key slot 210 which is formed at a lower part 313, a trigger 314 which is projected on a part of a circumference part with the second permanent magnet 315 fixed. At this time, the upper part of the rotating body 310 is combined with a separating plate 303 which exists at the second area 302 of the housing 100, and the lower part 313 of the rotating body 310 is combined to the penetrating hole 201 at the second housing cover 200 and projects the key slot 210 to the outside.

At this time, in accordance with one embodiment of the present invention, it is desirable to have the trigger 314 which is projected at a part of the external circumference to a direction of the upper part 311 of the rotating body 310.

Also, in accordance with one embodiment of the present invention, it is desirable that a plane of a magnetic field of the first permanent magnet 312 which is fixed at the upper part 311 of the rotating body 310 is perpendicular to a plane of a magnetic field of the second permanent magnet 315 which is fixed at the trigger 314.

Also, in accordance with one embodiment of the present invention, the first permanent magnet 312, wherein polarity is arranged to the circumference direction of the rotating body 310, plays a role of providing a direction change of the magnetic field resulting from a rotation of the rotating body 310 to the Hall device 311. And, the second permanent magnet 315, wherein polarity is arranged to the central axis direction of the rotating body 310, plays a role of providing a strength change of the magnetic field resulting from a rotation of the rotating body 310 to the lead switch 332

The restoring spring 320 in accordance with one embodiment of the present invention is located between the upper part 311 of the rotating body 310 and the separating plate 303, and plays a role of restoring the rotating body 310 to an original position when the rotating body 310 has rotated.

In accordance with one embodiment of the present invention, the rotating body 310 is capable of securing a stable movement against a vibration of a sensor or an external vibration by receiving an one-sided rotary power which always tries to return to the original position. Therefore, the sensor uniformly and securely provides the direction or the strength of the magnetic field to the Hall device 331 and the lead switch 332.

A printed circuit board 330 in accordance with one embodiment of the present invention has one side combined to the other side of the separating plate 303 which exists at the first area 301 of the housing 100, and has at least one Hall device 331 and at least one lead switch 332 attached to the side of the printed circuit board. Also, the wire 333 is formed on a part of the printed circuit board 330. The wire 333 is connected to the counter connector 130 at the outside penetrating through the connector 120 which is formed on the side part of the housing 100.

At this time, in accordance with one embodiment of the present invention, it is desirable that the lead switch 332 which is formed on one side of the printed circuit board 330 is equipped with a short-circuit switch signal with at least one contact point.

Also, in accordance with one embodiment of the present invention, the Hall device 331 which is attached to one side of the printed circuit board 330 is formed right above the first permanent magnet 312, having the separating plate 303 in between. Such a Hall device 331 plays a role of outputting the direction change of the magnetic field which is provided at the first permanent magnet 312 as a linear output signal.

Also, in accordance with one embodiment of the present invention, the lead switch 332 which is attached to one side of the printed circuit board 330 is formed right above the rotation circumference on which the second permanent magnet 315 moves, having the separating plate 303 in between. The lead switch 332 plays a role of outputting a switching signal at a place where the magnetic field which is provided from the second permanent magnet 315 makes a biggest change, and at this time, the lead switch 332 and the second permanent magnet 315 are on a straight line.

And, the Hall device 331 and the lead switch 332 are connected to the other related devices which are formed on the printed circuit board 330 through an electric wire, and, through an appropriate treatment such as amplification, filtering noise, switching signal, A/D, controller area network (CAN) communication transformation, sends the output signal to the wire 333. The wire 333 which conveys the output signal is connected to the external counter connector 130 and provides the sensor signal to the external devices.

At this time the separating plate 303 in accordance with one embodiment of the present invention plays a role of protecting the components which are formed inside of the housing 100 from the external dust and moisture at the atmosphere by physically separating the rotating body 310 and the lead switch 332.

The shielding cover 340 in accordance with one embodiment of the present invention plays a role of wrapping the first area 301 of the housing 100 where the printed circuit board 330 exists and securing the functional characteristic of the sensor by blocking the external magnetic or electric disturbance.

In accordance with one embodiment of the present invention, it is desirable that the shielding cover 340 includes a permalloy material which is made from Ni—Fe.

The signal of the Hall device 331 and the lead switch 332 which are outputted corresponding to the change of the magnetic field of the first permanent magnet 312 and the second permanent magnet 315 in accordance with one embodiment of the present invention is explained in detail hereinafter.

Figure 5:
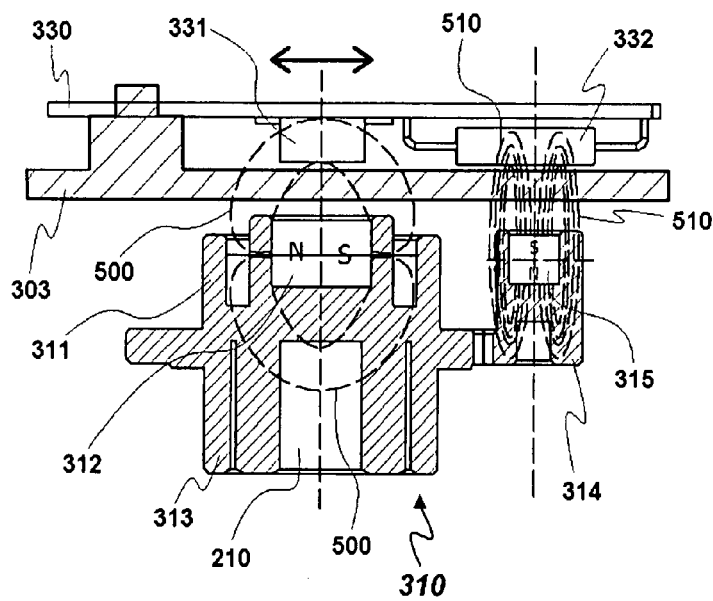
FIG. 5 is a cross-sectional view illustrating a rotating body and a printed circuit board in accordance with one embodiment of the present invention.

FIG. 5 is a cross-sectional view illustrating a rotating body and the printed circuit board in accordance with one embodiment of the present invention. When the rotating body 310 rotates in one side, the first permanent magnet 312 which is fixed to the upper part of the rotating body 310 provide the influence of a magnetic field 500 in the circumference direction of the rotating body 310 to the Hall device 331 which is attached to the printed circuit board 330. Therefore, the Hall device 331 is capable of linearly outputting the output signal corresponding to the rotation angle of the sensor. At this time, it is desirable that the distance between the first permanent magnet 312 and Hall device 331 is 8 mm or less than 8 mm.

Also, when the rotating body 310 rotates to one side against the housing 100, the second permanent magnet 315 which is projected on the circumference of the rotating body 310 provides influence of the magnetic field 510 on the lead switch 332 attached to the printed circuit board 330 in the central axis direction of the rotating body 310. Therefore, the lead switch 332 is capable of outputting a short circuit switching signal which operates independently of the linear output signal, corresponding to the strength of the magnetic field which is generated by the second permanent magnet 315.

Figure 6:
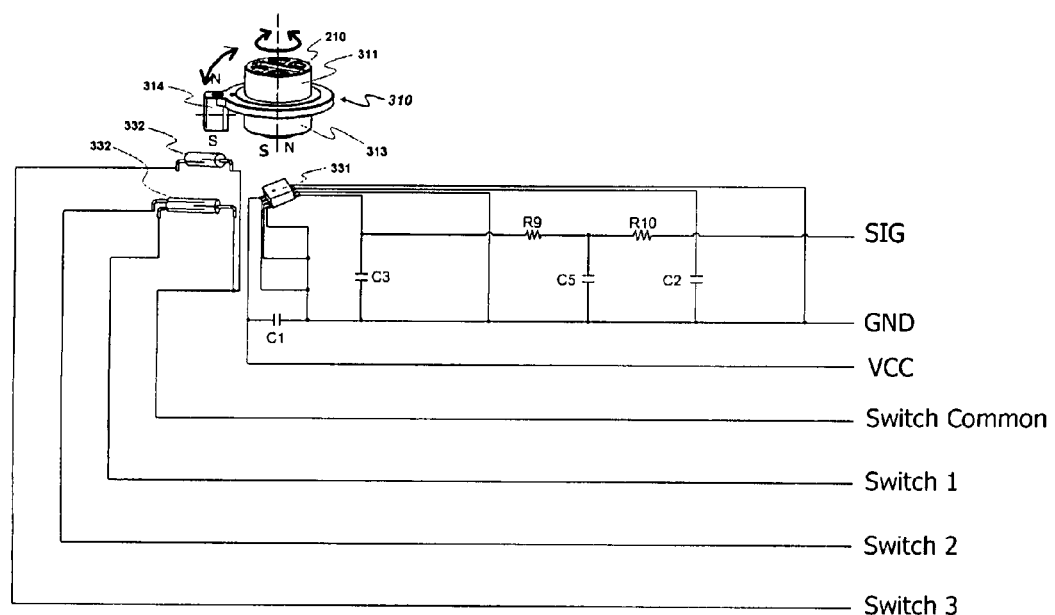
FIG. 6 is a logic circuit diagram illustrating steps of processing a linear output signal and a switching signal in accordance with one embodiment of the present invention.
Figure 7:
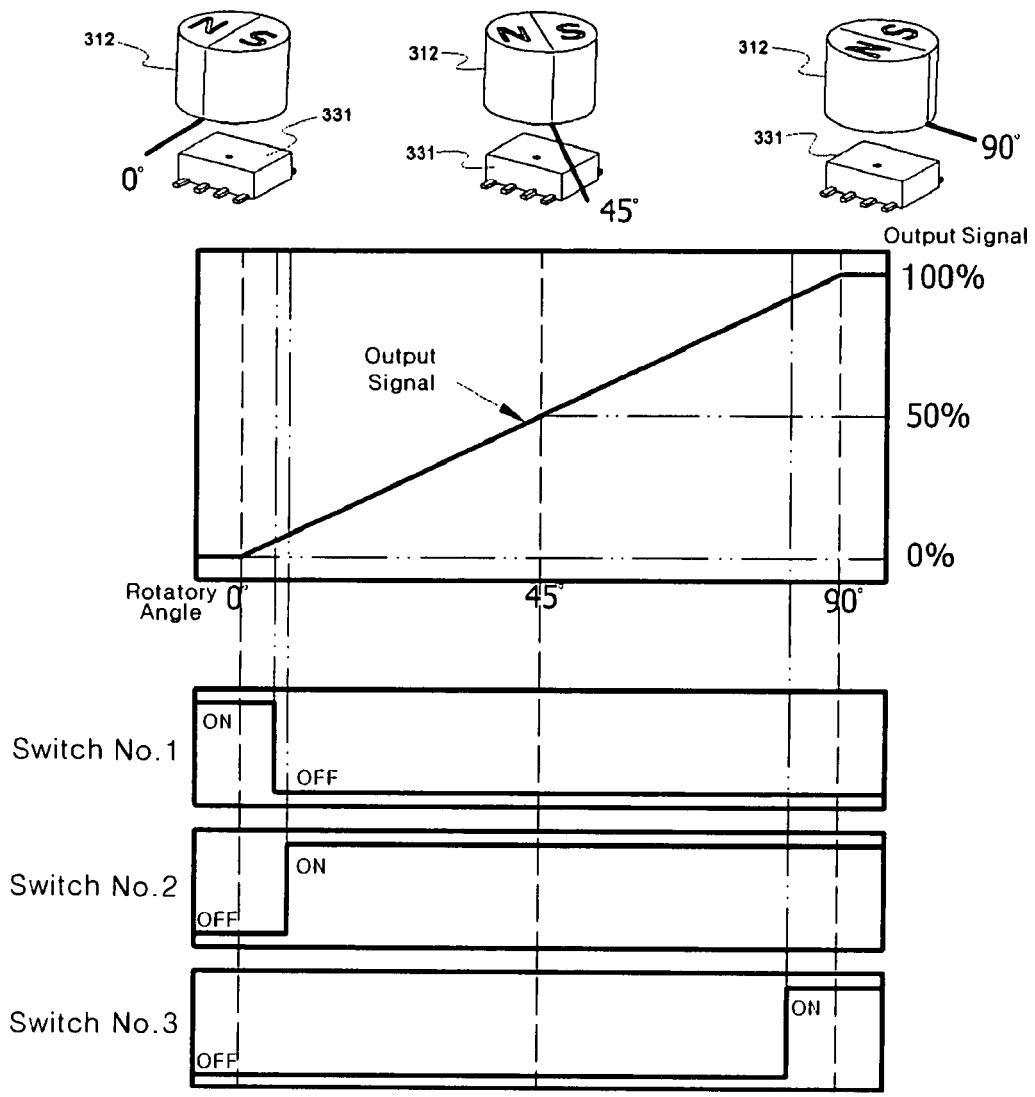
FIG. 7 is a graph illustrating the linear output signal and the switching signal corresponding to a rotary angle of a rotating body in accordance with one embodiment of the present invention.

FIG. 6 is a logic circuit diagram illustrating steps of processing a linear output signal and a switching signal in accordance with one embodiment of the present invention and FIG. 7 is a graph illustrating the linear output signal and switching signal corresponding to a rotary angle of a rotating body in accordance with one embodiment of the present invention. As shown in FIG. 6 and FIG. 7, the linear output signal of the Hall device 331 corresponding to the change of magnetic field of the first permanent magnet 312 and the switching signal of the lead switch 332 corresponding to the change of magnetic field of the second permanent magnet 315 are outputted independently. At this time, the lead switch 332 is designed to get at least one contact of short circuit switching signal, and the on/off status of the short circuit switching signal can be appropriately changed as needed.

Figure 8:
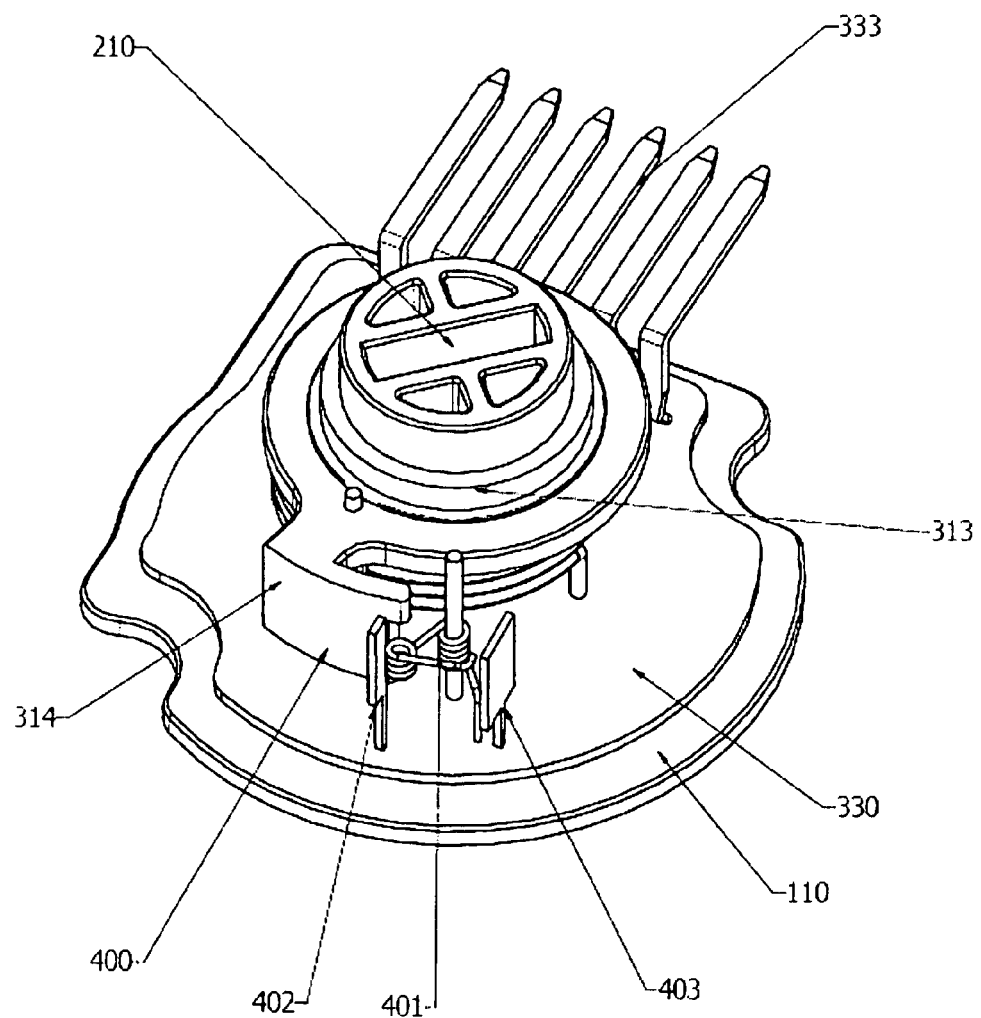
FIG. 8 is a perspective view illustrating a rotating body in accordance with another embodiment of the present invention.

FIG. 8 is a perspective view illustrating a rotating body of non-contact rotary movement sensor with an independent switch including a contact switch in accordance with another embodiment of the present invention. As shown in FIG. 8, according to another embodiment of the present invention, at the initial state when the rotating body 313 does not rotate, the pushing rod 400 moves the common contact part 401 comprising a coil spring by the restoring force of the restoring spring 320 to make the common contact part 401 to constantly contact a first contact part 403 of a cylinder shape. When the rotating body 313 is rotated by an external force, the pushing rod 400 recedes from the common contact part 401, and a portion of common contact part 401 contacts a second contact part 402 of a plate shape, returning to the original position by the restoring force. At this time, the common contact part 401 remains touching the first contact part 403 by switch spring release for a predetermined time before touching the second contact part 402. The contact switch by the process is capable of outputting the same switching signal with the lead switch 332 using the second permanent magnet 315 in accordance with the one embodiment of the present invention.

At this time, it is desirable that the common contact part 401 in accordance with another embodiment of the present invention is elastic enough to make a repeated contacting and separating with the first contact part 403 or the second contact part 402. Such elasticity can be acquired using a coil spring.

Figure 9:
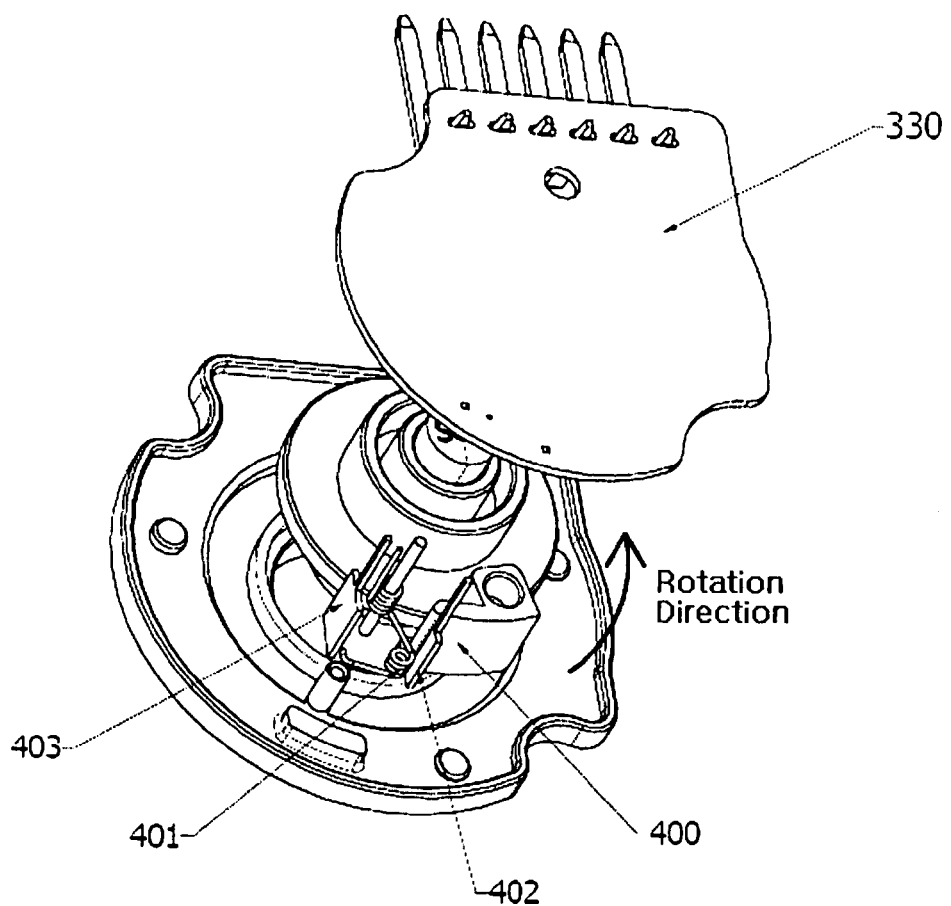
FIG. 9 is a perspective view illustrating a non-contact rotary movement sensor with an independent switch in accordance with another embodiment of the present invention.

FIG. 9 is a perspective view illustrating a non-contact rotary movement sensor with an independent switch in accordance with another embodiment of the present invention. As shown in FIG. 9, the non-contact rotary movement sensor in accordance with another embodiment of the present invention utilizes a mechanical contact switch instead of the lead switch 332 which uses the second permanent magnet 315. At this time, the mechanical contact switch can include a spring.

The non-contact rotary movement sensor with an independent switch including a contact switch in accordance with another embodiment of the present invention has a permanent magnet (the same with the first permanent magnet 312 of one embodiment of the present invention), a Hall device 331 which senses it, and a trigger 314 which is projected on a part of the circumference of the rotating body and a pushing rod 400 installed on the trigger 314, and includes a common contact part 401 with a portion moving corresponding to the rotation of the rotating body 313, and a first contact part 403 and a second contact part 402 for outputting the switching signal by contacting or detaching from the common contact 401.

At this time, a common contact in accordance with another embodiment of the present invention can comprises a coil spring, thereby being operated by elastic force. Although certain example methods, apparatus and articles of manufacture have been described herein, the scope of coverage of this invention is not limited thereto. On the contrary, this patent covers all methods, apparatus and articles of manufacture fairly falling within the scope of the appended claims either literally or under the doctrine of equivalents.

The non-contact rotary movement sensor with an independent switch of the present invention is capable of outputting a normal signal even with one of signal transformers out of order, by providing a Hall device and a non-contact lead switch or a contact switch, which operates independently of the Hall device.

Also, the non-contact rotary movement sensor with an independent switch of the present invention is capable of extending a life span of the rotary movement sensor as a separating plate is formed to protect the electric components of the sensor from the external dust and atmospheric moisture.

Also, the non-contact rotary movement sensor with an independent switch of the present invention is capable of protecting the circuit from external magnetic or electric disturbance by including a shielding cover in its configuration. This results in the effect of reducing distortion of output signals, which is caused by the irregularity and nonlinearity of a magnetic field by electromagnetic waves.

While the invention has been shown and described with respect to the preferred embodiments, it will be understood by those skilled in the art that various changes and modifications may be made without departing from the spirit and scope of the invention.

What is claimed is:

1. A non-contact rotary movement sensor with an independent switch, comprising:
   a rotating body, provided with a first permanent magnet installed on an upper part, a key slot installed on a lower part, and a second permanent magnet installed on a trigger which is projected on a part of an external circumference, for being rotatably driven by an external force, wherein the first permanent magnet and the second permanent magnet are installed not to be affected by mutual magnetic fields; and
   a printed circuit board provided with at least one Hall device for outputting a linear output signal by detecting a direction change of a magnetic field of the first permanent magnet and at least one lead switch for outputting a switching signal by detecting a strength change of a magnetic field of the second permanent magnet.

2. The non-contact rotary movement sensor with an independent switch as recited in claim 1, further comprising:
   a housing provided with an inside thereof divided into a first area and a second area by a separating plate; and
   a shielding cover for blocking an external magnetic or an electric disturbance to the printed circuit board.

3. The non-contact rotary movement sensor with an independent switch as recited in claim 2, wherein the housing includes a first housing cover which covers the first area and a second housing cover which covers the second area.

4. The non-contact rotary movement sensor with an independent switch as recited in claim 3, wherein the printed circuit board and the rotating body are arranged at the first area and the second area respectively.

5. The non-contact rotary movement sensor with an independent switch as recited in claim 3, wherein the second housing cover includes a penetrating hole through which a lower part of the rotating body penetrates, so as to expose the key slot to an outside.

6. The non-contact rotary movement sensor with an independent switch as recited in claim 1, wherein the rotating body includes a restoring spring, installed on an upper part of the rotating body, for restoring the rotating body to an original position when the rotating body is rotated.

7. The non-contact rotary movement sensor with an independent switch as recited in claim 1, wherein the first permanent magnet includes a plurality of poles arranged to a circumference direction of the rotating body and the second permanent magnet includes a plurality of poles arranged to a central axis direction of the rotating body.

8. The non-contact rotary movement sensor with an independent switch as recited in claim 1, wherein the Hall device is installed right above the first permanent magnet, and the lead switch is installed right above the second permanent magnet on a switching position.

9. The non-contact rotary movement sensor with an independent switch as recited in claim 8, wherein the lead switch includes a short circuit switching signal with at least one contact, and outputs a short circuit switching signal when positioned on a straight line with the second permanent magnet.

10. The non-contact rotary movement sensor with an independent switch as recited in claim 1, wherein the trigger is projected to an upper part direction of the rotating body.

11. A non-contact rotary movement sensor with an independent switch, comprising:
    a rotating body, provided with a permanent magnet installed at the upper part, a key slot installed at a lower part, and a pushing rod installed on a trigger which is projected on a part of an external circumference, for being rotatably driven by an external force; and
    a printed circuit board connected with at least one Hall device for outputting a linear output signal by detecting a direction change of a magnetic field of the permanent magnet, a common contact part which moves by the pushing rod according to the rotation of the rotating body, and a first contact part and a second contact part which are contacted with the common contact part, alternatively.

12. The non-contact rotary movement sensor with an independent switch as recited in claim 11, wherein the rotating body an independent switch, wherein the common contact part is in contact with the first contact part by a restoring force and the common contact is in contact with the second contact part by an external force.

13. The non-contact rotary movement sensor with an independent switch as recited in claim 11, further comprising:
    a housing provided with an inside divided into a first area and a second area by a separating plate.

14. The non-contact rotary movement sensor with an independent switch as recited in claim 13, wherein the housing includes a first housing cover which covers the first area and a second housing cover which covers the second area.

15. The non-contact rotary movement sensor with an independent switch as recited in claim 11, wherein the printed circuit board and the rotating body are arranged at the first area and the second area, respectively.

16. The non-contact rotary movement sensor with an independent switch as recited in claim 14, wherein the second housing cover includes a penetrating hole through which a lower part of the rotation body penetrates, so as to expose the key slot to an outside.

17. The non-contact rotary movement sensor with an independent switch as recited in claim 11, wherein the permanent magnet includes a plurality of poles arranged to a circumference direction of the rotating body.

18. The non-contact rotary movement sensor with an independent switch as recited in claim 11, wherein the Hall device is installed right above the permanent magnet.

19. The non-contact rotary movement sensor with an independent switch as recited in claim 11, wherein the common contact part comprises a coil spring.

* * * * *